(12) United States Patent
Fontanazzi et al.

(10) Patent No.: US 10,195,790 B2
(45) Date of Patent: Feb. 5, 2019

(54) FORMING ASSEMBLY AND METHOD FOR FORMING A PLURALITY OF SEALED PACKS FOR POURABLE FOOD PRODUCTS STARTING FROM A TUBE OF PACKAGING MATERIAL

(71) Applicant: Tetra Laval Holdings & Finance S.A., Pully (CH)

(72) Inventors: Paolo Fontanazzi, Modena (IT);
Massimo Pradelli, Reggio Emilia (IT);
Fabrizio Rimondi, Castel San Pietro Terme (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/542,796

(22) PCT Filed: Feb. 2, 2016

(86) PCT No.: PCT/EP2016/052113
§ 371 (c)(1),
(2) Date: Jul. 11, 2017

(87) PCT Pub. No.: WO2016/124560
PCT Pub. Date: Aug. 11, 2016

(65) Prior Publication Data
US 2018/0001574 A1    Jan. 4, 2018

(30) Foreign Application Priority Data
Feb. 4, 2015   (EP) .................................... 15153730

(51) Int. Cl.
*A63B 39/00*    (2006.01)
*A63B 41/00*    (2006.01)
(Continued)

(52) U.S. Cl.
CPC .......... *B29C 66/4312* (2013.01); *B29C 65/02* (2013.01); *B29C 65/3656* (2013.01);
(Continued)

(58) Field of Classification Search
CPC ......... B29C 65/02; B29C 65/18; B29C 65/22; B29C 65/78; B29C 65/7858;
(Continued)

(56) References Cited

U.S. PATENT DOCUMENTS 4,073,121 A    2/1978  Greenawalt et al.
5,001,891 A    3/1991  Abate
(Continued)

FOREIGN PATENT DOCUMENTS

EP         0 887 265         11/2002

OTHER PUBLICATIONS

International Search Report and Written Opinion in corresponding PCT Application PCT/EP2016/052113 dated Apr. 26, 2016 (12 pages).

*Primary Examiner* — Philip C Tucker
*Assistant Examiner* — Brian R Slawski
(74) *Attorney, Agent, or Firm* — Finnegan, Henderson, Farabow, Garrett & Dunner LLP

(57) ABSTRACT

There is described a forming assembly (10b) for forming a plurality of sealed packs (3) starting from a tube (2) of packaging material, comprising first conveying means (15b) movable along a first path (Q) comprising: a first operative branch (Q1), which has a main elongation direction parallel to an advancing direction (A) of the tube (2); and a first return branch (Q2) comprising an initial portion (35b) which is arranged immediately downstream of the operative branch (Q1) and extends transversally to the advancing direction (A); first conveying means (14b, 15b, 14b') comprise one of a sealing element (22b) or a counter-sealing element (22a);
(Continued)

and a first half-shell (21b), which is movable along the operative branch (Q1) between: a first rest position, in which it is detached from the tube (2) or the formed pack (3); and a first operative position, in which it grips the tube (2) or the formed pack (3); the first half-shell (21b) is arranged in the first operative position along a first portion (34b) of the first operative branch (Q1); the first half-shell (21b) is kept in the first operative position along an initial portion (35b), so as to grip and convey the pack (3) in a staggered position with respect to the advancing direction (A); and moves, from the first operative position to the rest position at an end (36b) of the initial portion (35b) opposite to the first portion (34b), so as to discharge the pack (3) in a staggered position with respect to the advancing direction (A).

15 Claims, 6 Drawing Sheets

(51) Int. Cl.

| | | |
|---|---|---|
| *B29C 65/00* | (2006.01) | |
| *B32B 37/00* | (2006.01) | |
| *B32B 38/04* | (2006.01) | |
| *C08J 5/00* | (2006.01) | |
| *B32B 38/10* | (2006.01) | |
| *B65B 9/06* | (2012.01) | |
| *B29C 65/36* | (2006.01) | |
| *B29C 65/74* | (2006.01) | |
| *B29C 65/78* | (2006.01) | |
| *B29C 65/02* | (2006.01) | |
| *B65B 51/30* | (2006.01) | |
| *B65B 61/24* | (2006.01) | |
| *B65B 61/28* | (2006.01) | |
| *B65B 9/12* | (2006.01) | |
| *B29L 31/00* | (2006.01) | |
| *B29K 23/00* | (2006.01) | |
| *B29K 105/00* | (2006.01) | |

(52) U.S. Cl.
CPC .......... *B29C 65/74* (2013.01); *B29C 65/7451* (2013.01); *B29C 65/7897* (2013.01); *B29C 66/1122* (2013.01); *B29C 66/71* (2013.01); *B29C 66/72321* (2013.01); *B29C 66/72328* (2013.01); *B29C 66/73921* (2013.01); *B29C 66/81457* (2013.01); *B29C 66/82263* (2013.01); *B29C 66/8351* (2013.01); *B29C 66/849* (2013.01); *B65B 9/06* (2013.01); *B65B 9/12* (2013.01); *B65B 51/306* (2013.01); *B65B 61/24* (2013.01); *B65B 61/28* (2013.01); *B29C 65/368* (2013.01); *B29K 2023/06* (2013.01); *B29K 2023/086* (2013.01); *B29K 2105/256* (2013.01); *B29K 2995/0067* (2013.01); *B29L 2031/7166* (2013.01)

(58) Field of Classification Search
CPC ............ B29C 65/7861; B29C 65/7867; B29C 65/787; B29C 65/7873; B29C 65/7897; B29C 66/50; B29C 66/61; B29C 66/43; B29C 66/431; B29C 66/4312; B65B 9/207; B65B 51/306
USPC ..... 156/60, 69, 90, 145, 156, 196, 199, 200, 156/204, 212, 227, 250, 251, 269, 285, 156/287, 292, 308.2, 308.4, 309.6, 349, 156/443, 459, 461, 465, 466, 510, 511, 156/515, 538, 539, 543, 553; 53/370.6, 53/550, 551, 552
See application file for complete search history.

(56) References Cited

U.S. PATENT DOCUMENTS

| | | | | |
|---|---|---|---|---|
| 6,035,615 | A * | 3/2000 | Hansson | B29C 65/18 493/302 |
| 6,038,838 | A * | 3/2000 | Fontanazzi | B65B 51/30 53/551 |
| 6,112,498 | A * | 9/2000 | Hansson | B65B 51/30 53/551 |
| 2002/0014055 | A1 | 2/2002 | Iwasa et al. | |

* cited by examiner

FORMING ASSEMBLY AND METHOD FOR FORMING A PLURALITY OF SEALED PACKS FOR POURABLE FOOD PRODUCTS STARTING FROM A TUBE OF PACKAGING MATERIAL

This is a National Phase of PCT Application No. PCT/EP2016/052113, filed Feb. 2, 2016, which claims the benefit of EP Application No. 15153730.5 filed Feb. 4, 2015, which is incorporated herein by reference.

TECHNICAL FIELD

The present invention relates to a forming assembly and to a method for forming a plurality of sealed packs for pourable food products starting from a tube of packaging material.

BACKGROUND OF INVENTION

As is known, many liquid or pourable food products, such as fruit juice, UHT (ultra-high-temperature treated) milk, wine, tomato sauce, etc., are sold in packages made of sterilized packaging material.

A typical example is the parallelepiped-shaped package for liquid or pourable food products known as Tetra Brik Aseptic (registered trademark), which is made by folding and sealing laminated strip packaging material. The packaging material has a multilayer structure comprising a base layer, e.g. of paper, covered on both sides with layers of heat-seal plastic material, e.g. polyethylene. In the case of aseptic packages for long-storage products, such as UHT milk, the packaging material also comprises a layer of oxygen-barrier material, e.g. an aluminium foil, which is superimposed on a layer of heat-seal plastic material, and is in turn covered with another layer of heat-seal plastic material forming the inner face of the package eventually contacting the food product.

Packages of this sort are normally produced on fully automatic packaging units, on which a continuous tube is formed from the web-fed packaging material; the web of packaging material is sterilized on the packaging unit, e.g. by applying a chemical sterilizing agent, such as a hydrogen peroxide solution, which, once sterilization is completed, is removed from the surfaces of the packaging material, e.g. evaporated by heating; the web so sterilized is then maintained in a closed, sterile environment, and is folded and sealed longitudinally to form a tube, which is fed along a vertical advancing direction.

In order to complete the forming operations, the tube is filled with the sterilized or sterile-processed food product, and is sealed and subsequently cut along equally spaced transversal cross sections.

Pillow packs are so obtained, which have a longitudinal sealing band and a pair of top and bottom transversal sealing bands.

Packaging units are known, as described for example in European Patent EP-B-0887265, which comprise two chain conveyors defining respective endless paths.

In greater detail, the first conveyor is fitted with a plurality of first jaws, each comprising a respective sealing element and a respective extractable cutting element.

The second conveyor is fitted with a plurality of second jaws, each associated to a relative first jaw and comprising a respective counter-sealing element and a respective seat.

In particular, the sealing element is a heating element and the counter-sealing element is made of elastomeric material, which provides the necessary mechanical support to grip the tube to the required pressure.

The paths of the chain conveyors comprise:
  respective operative branches substantially facing and parallel to each other, and between which the tube of packaging material is fed, so that the first jaws cooperate with the second jaws on the other conveyor to grip the tube at a number of successive cross sections and to heat-seal the tube and cut the packs; and
  respective return branches, along which the first jaws and the second jaws are spaced apart from the tube.

In greater detail, the first jaws and the corresponding second jaws at first move away from each other and then move towards each other, as they move along return branches downstream of the operative branches with respect to the advancing direction of the chain conveyors.

As each first jaw cooperates with the corresponding second jaw along the operative branches, the respective sealing element cooperates with the respective counter-sealing element to heat-seal the tube at a corresponding transversal section.

Furthermore, as each first jaw cooperates with the corresponding second jaw, the respective cutting element is extracted to cut the formed sealed packs at the transversal section so as to form corresponding sealed packages.

Each first jaw and second jaw also comprises respective forming half-shells, which are hinged with respect to the relative sealing element or the counter-sealing element, so as to control the volume of the relative packs in formation.

The half-shells of each first jaw and of the corresponding second jaw move cyclically between:
  an open position, in which they are detached from the tube; and
  a closed position, in which they contact the tube and fold the portion of the tube between two consecutive sealing sections to define and control the volume of the packs being formed.

In this way, as the sealing element of each first jaw seals the pack in formation, the half-shells of the same first jaw and of the corresponding second jaw control the volume of the pack in formation.

More specifically, the half-shells may be spring-loaded by respective springs into the respective open position, and have respective rollers, which cooperate with respective cams designed to move the half-shells into the respective closed position by the time the forming assembly reaches a predetermined position as it moves down.

Each half-shell has a C-shaped cross section, and comprises, integrally: a main wall, and two parallel lateral flaps projecting towards the axis of the tube of packaging material from respective opposite end edges of the main wall.

In the closed position, the main walls are located on opposite sides of the tube axis, are parallel to each other, and cooperate with respective first portions of the tube.

In the closed position, the flaps of one half-shell cooperate with respective second portions of the tube to completely control the volume of the pack being formed, and, on the opposite side to the relative main wall, face corresponding flaps on the other half-shell.

Finally, the packaging unit comprises a pair of fixed cam assemblies arranged on respective sides of the tube.

The cam assemblies cooperate in rolling manner with respective rollers carried by the first jaws and the second jaws.

The profiles of the cam assemblies are so designed to move the first jaws and the second jaws along the respective return branches and operative branches, and to ensure the smoothest transition between the various positions assumed by the first jaws and the second jaws, so as to prevent undesired stress on the materials.

The cam assemblies are shaped so as to displace, after the completion of the formation of the tube, the half-shells from the closed position to the open position, as they travel parallel to the advancing direction of the tube.

In this way, the cut and sealed packs fall, under the gravity action, towards an outlet conveyor, which is arranged in the lower region of the packaging unit and along the advancing direction of the tube.

Though performing excellently on the whole, the packaging units of the type described still leave room for further improvement.

In particular, the Applicant has found that there is the risk that the packaging material of a formed packs can stick to the packaging material intended to form the immediately upstream pack in formation, thus creating connecting bridges between two consecutive packs.

As a result, there is the risk that the gravity action is not able to ensure a proper, repeatable and precise detachment of the packs and, therefore, transport of the packs towards the outlet conveyor.

A need is felt within the industry to improve the repeatability and the precision of the detachment of the packs and, therefore, transport of the formed packs towards the outlet conveyor.

DISCLOSURE OF INVENTION

It is therefore an object of the present invention to provide a forming assembly for forming a plurality of sealed packs for pourable food products starting from a tube of packaging material, which meets at least one of the above-identified needs.

According to the present invention, there is provided a forming assembly for forming a plurality of sealed packs for pourable food products starting from a tube of packaging material, as claimed in claim 1.

The present invention also relates to a method for forming a plurality of sealed packs for pourable food products starting from a tube of packaging material, as claimed in claim 10.

BRIEF DESCRIPTION OF THE DRAWINGS

One preferred, non-limiting embodiments of the present invention will be described by way of example with reference to the accompanying drawings, in which.

DETAILED DESCRIPTION OF PREFERRED EMBODIMENTS

Figure 1:
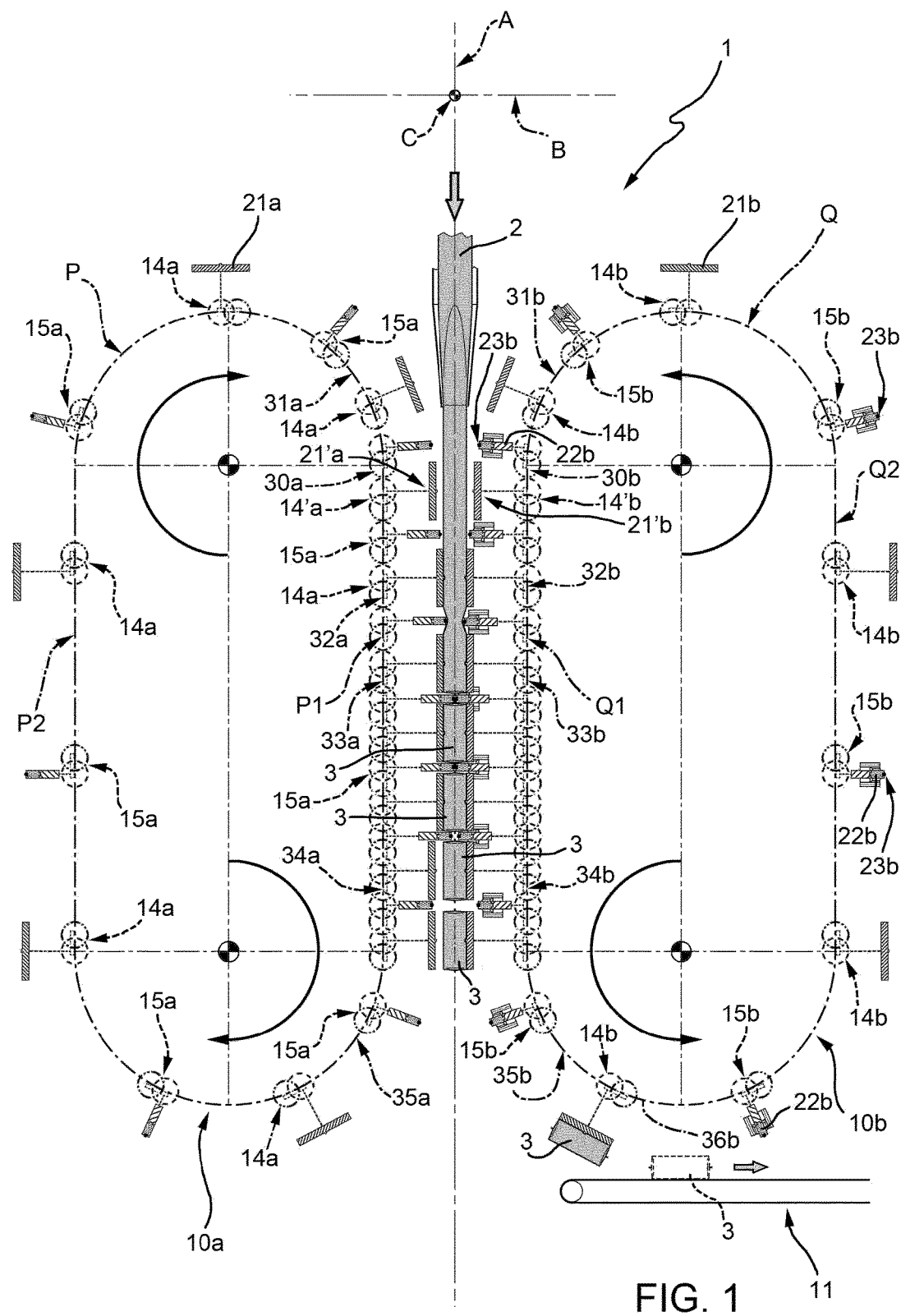
FIG. 1 is a frontal view of a packaging unit for forming a plurality of sealed packages comprising a pair of forming assemblies according to the present invention.
Figure 2:
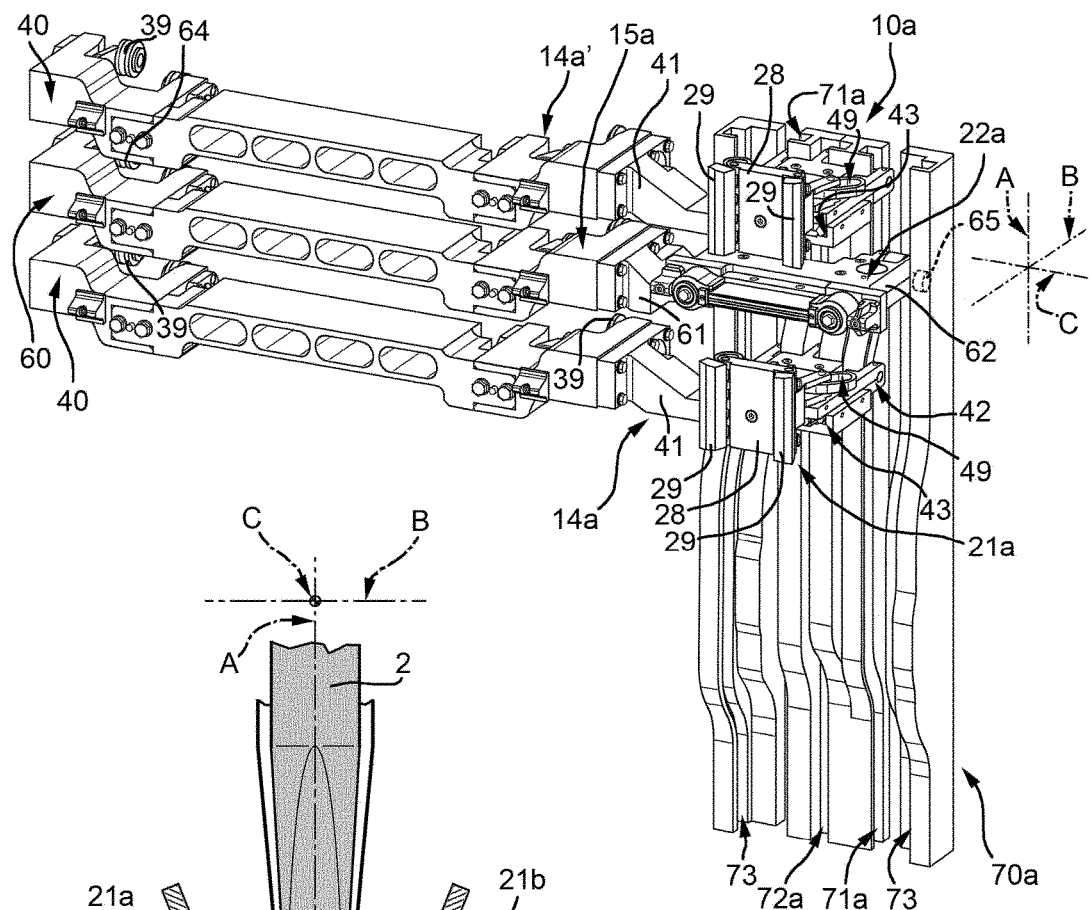
FIG. 2 shows, in an enlarged view, first components of the packaging unit of FIG. 1, with parts removed for clarity.

With reference to FIGS. 1 to 7, number 1 indicates as a whole a packaging unit for producing sealed packs 3 of a pourable food product, such as pasteurized milk or fruit juice, from a tube 2 of sheet packaging material.

The packaging material has a multilayer structure (not shown), and comprises a layer of fibrous material, normally paper, covered on both sides with respective layers of heat-seal plastic material, e.g. polyethylene.

In the case of aseptic packages for long-storage products, such as UHT milk, the packaging material also comprises a layer of gas- and light-barrier material, e.g. aluminium foil or ethylene vinyl alcohol (EVOH) film, which is superimposed on a layer of heat-seal plastic material, and is in turn covered with another layer of heat-seal plastic material forming the inner face of the package eventually contacting the food product.

Tube 2 is formed in known manner by longitudinally folding and sealing a web (not shown) of heat-seal sheet material, is filled by a pipe (not shown) with the sterilized or sterile-processed food product for packaging, and is fed, in known manner not shown, along a vertical path having an axis A.

Axis A is vertical in the embodiment shown.

It is also possible to identify:
a direction B, which is orthogonal to axis A and horizontal in the embodiment shown; and
a direction C, which is orthogonal to both axis A and direction B and is horizontal in the embodiment shown.

In greater detail, unit 1 comprises:
a pair of forming assemblies 10a, 10b, which are arranged on respective lateral sides with respect to axis A and are spaced apart with respect to one another along direction B, and which are adapted to interact with tube 2, so as to form a number of pillow packs 3 separated from one another; and
an outlet conveyor 11, which is arranged below forming assembly 10a, 10b and is staggered from axis A along direction B, and which is adapted to receive formed packs 3 discharged by forming assembly 10b.

Forming assemblies 10a, 10b interact with tube 2 to heat seal it at equally spaced cross sections and form a number of pillow packs 3 (FIG. 1) connected to tube 2 by transversal sealing bands crosswise to axis A. Furthermore, forming assemblies 10a, 10b interact with tube 2 to cut pillow packs 3 along respective sealing bands, so as to separate pillow pack 3 from one another.

Outlet conveyor 11 conveys packs 3 towards a not-shown folding unit, in which packs 3 are folded into corresponding not-shown packages.

Forming assembly 10a substantially comprises:
a frame 12a, which defines a plurality, two in the embodiment shown, of tracks 13a spaced along direction C with respect to one another; and
a plurality of groups of carriages 14a', 15a, 14a consecutive and immediately adjacent to one another.

Forming assembly 10b substantially comprises:
a frame 12b, which defines a plurality, two in the embodiment shown, of tracks 13b spaced along direction C with respect to one another; and
a plurality of groups of carriages 14b', 15b, 14b consecutive and immediately adjacent to one another.

Each frame 12a, 12b comprises:
two oval planar end surfaces 16a, 16b opposite to another, lying on respective planes parallel to axis A and vertical in the embodiment shown; and
a curved continuous surface 17a, 17b, which extends between surfaces 16a, 16b along a direction B, orthogonal to axis A.

Furthermore, each track 13a, 13b comprises (FIG. 3):
a rectilinear portion 18a, 18b, which extends parallel to axis A and faces tube 2;
a rectilinear portion 19a, 19b, which extends parallel to axis A and is opposite to respective portion 18a, 18b; and
a pair of curved portions 20a, 20b, which are interposed between portions 18a, 18b; and 19a, 19b.

Each carriage 14a, 14a' of forming assembly 10a is associated to a corresponding carriage 14b, 14b' of forming assembly 10b.

In the very same way, each carriage 15a of forming assembly 10a is associated to a corresponding carriage 15b.

Each pair of corresponding carriages 14a, 14b (or 14a', 14b') and the pair of immediately precedent and subsequent carriages 15a, 15b form and seal a relative pack 3.

In the following of the present description, only one group of corresponding carriages 14a', 15b, 14a and the respective group of corresponding carriages 14b', 15b, 15a will be described, being all the carriages 14a', 14b'; 15a, 15b; 14a, 14b identical to one another.

Each carriage 14a', 14a and corresponding carriage 14b', 14b comprises respective half-shells 21a', 21a; 21b', 21b.

In detail, half-shell 21a, 21b; 21a', 21b' has a C-shaped cross section and comprises (FIGS. 2, 4 and 6):
a main wall 28; and
a pair of lateral flaps 29, which project from wall 28 towards axis A from respective opposite edges of wall 28 and are hinged to respective opposite edges of wall 28 about respective axes.

Carriage 15b comprises a sealing element 22b and an extractable cutting element 23b.

Corresponding carriage 15a comprises a counter-sealing element 22a and a not-shown seat, which is adapted to receive cutting element 23b, when the latter is extracted.

In the embodiment shown, sealing elements 22b are heating elements. Counter-sealing elements 22a are made of elastomeric material, which provides the necessary mechanical support to grip tube 2 to the required pressure.

Carriages 14a', 14b'; 14a, 14b and carriages 15a, 15b are self-movable on respective tracks 13a, 13b independently from one another.

In this way, half-shells 21a'; 21a and counter-sealing elements 22a of forming assembly 10a are movable independently of one another.

Half-shells 21b'; 21b and sealing elements 22b are movable independently of one another.

Figure 5:
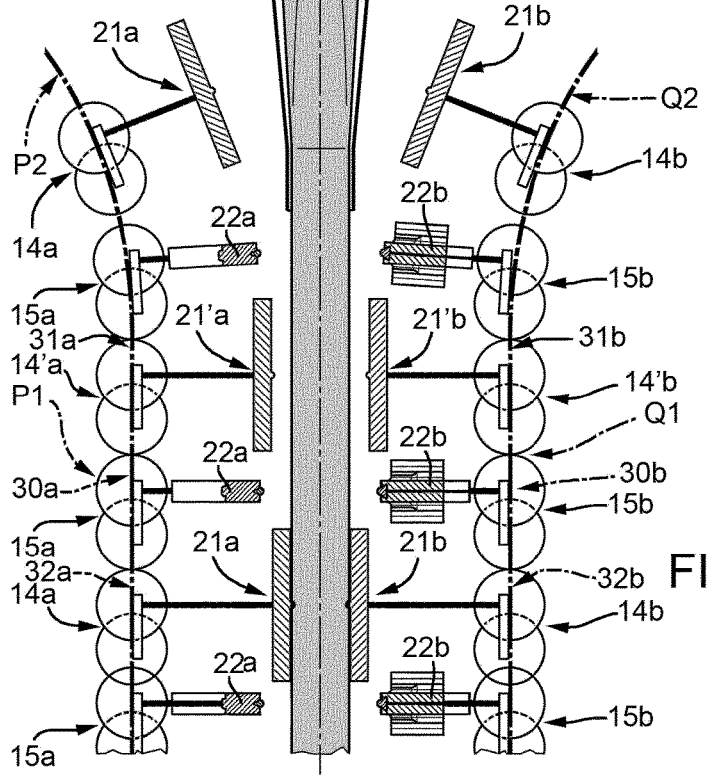
FIG. 5 is a schematic view of different operative position of the packaging unit of FIGS. 1 to 4, with parts removed for clarity.
Figure 3:
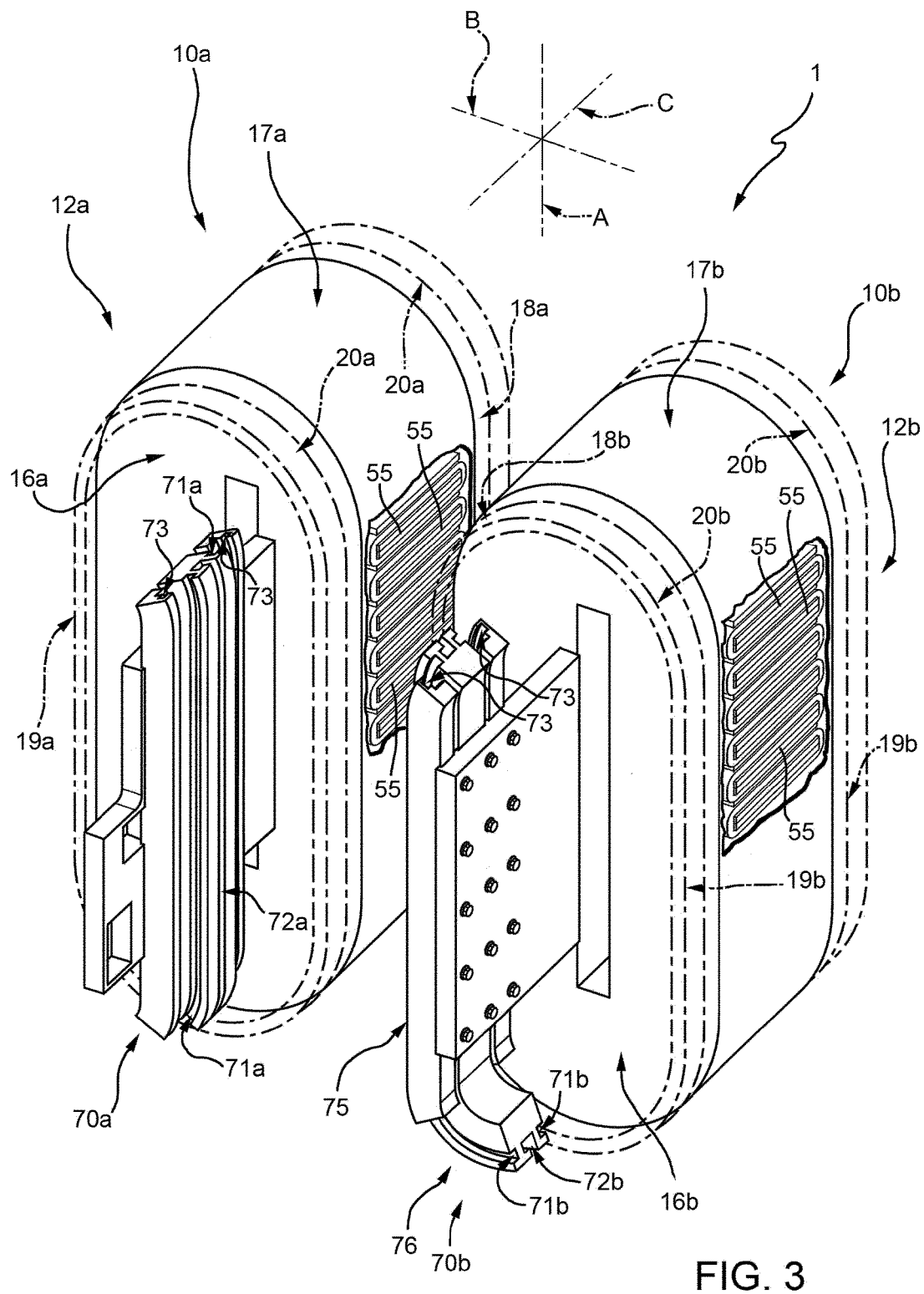
FIG. 3 shows in an enlarged perspective view of further components of the packaging unit of FIG. 1, with parts removed for clarity.

With particular reference to FIGS. 1 and 5, half-shells shells 21a', 21b'; 21a, 21b, counter-sealing elements 22a and sealing elements 22b are driven by respective carriages 14a' 14b'; 14a, 14b; 15a, 15b along a cyclic endless path P, Q.

In particular, carriage 14a', 14b' is arranged upstream of carriage 15a, 15b and carriage 15a, 15b is arranged upstream of carriage 14a, 14b, proceeding along path P, Q according to the advancing direction of carriages 14a', 14b'; 15a, 15b; 14a, 14b.

Path P, Q comprises, proceeding along the advancing direction of carriages 14a', 14a; 14b', 14b; 15a, 15b (shown in FIG. 1):

an operative branch P1, Q1, along which half-shells 21a', 21b'; 21a, 21b, counter-sealing elements 22a and sealing elements 22b downwardly move parallel to axis A and are arranged on respective opposite sides of tube 2; and
a return branch P2, Q2, along which half-shells 21a', 21b'; 21a, 21b, counter-sealing elements 22a and sealing elements 22b subsequently move away from axis A, upwardly move parallel to axis A on the opposite side of tube 2, and moves back towards axis A.

In greater detail, half-shells 21a', 21b'; 21a, 21b, counter-sealing elements 22a and sealing elements 22b are driven along operative branch P1, Q1, as respective carriages 14a', 14b', 14a, 14b; 15a, 15b move along respective rectilinear portion 18a, 18b of relative tracks 13a, 13b.

Counter-sealing elements 22a and sealing elements 22b are driven along return branch P2, Q2, as respective carriages 15a, 15b move along respective rectilinear portion 19a, 19b and curved portions 20a, 20b of relative tracks 13a, 13b.

When they are driven by respective carriages 14a', 14a, 14b'; 14b along respective operative branch P1, Q1 of path P, Q, half-shell 21a', 21b' are arranged above counter-sealing element 22a and sealing element 22b and above respective half-shell 21a, 21b.

Furthermore, counter-sealing element 22a and sealing element 22b are arranged above respective half-shell 21a, 21b.

When they are driven by respective carriages 14a', 14b'; 14a, 14b along respective operative branch P1, Q1 of path P, Q, half-shells 21a', 21b'; 21a, 21b, counter-sealing elements 22a and sealing elements 22b are cyclically moved back and forth parallel to direction B (FIG. 5) and between:
respective closed positions, in which they cooperate with tube 2 during the formation of packs 3 and with formed packs 3 after the formation thereof; and
respective open positions, in which they are detached from tube 2.

In other words, the movement of half-shells 21a', 21b'; 21a, 21b, and counter-sealing element 22a and sealing element 22b along direction B between the respective open positions and closed positions is superimposed to the movement along operative branch P1, Q1.

When half-shells 21a', 21b'; 21a, 21b are both in the respective closed position, they define a substantially parallelepiped cavity (FIGS. 1, 4 and 5) and accordingly control the volume of relative pack 3 in formation.

In particular, when half-shells 21a', 21b'; 21a, 21b are in respective closed positions, respective walls 28 are located on opposite sides of axis A, are parallel to each other, and cooperate with tube 2. In the closed position, flaps 29 of one half-shell 21a', 21b'; 21a, 21b cooperate with tube 2 to completely control the volume of pack 3 in formation, face flaps 29 of the other half-shells 21a', 21b'; 21a, 21b and are substantially orthogonal to respective wall 28.

On the contrary, when half-shells 21a', 21b'; 21a, 21b are in respective open positions, walls 28 are detached from tube 2 and walls 29 diverge from relative walls 28.

When counter-sealing element 22a and sealing element 22b are in the respective closed position, they heat-seal tube, so as form the transversal sealing band of pack 3.

At the same time, cutting element 23b is extracted, so as to separate the formed pack 3 from one another.

Along operative branches P1, Q1 of path P, Q:
at first, half-shells 21a', 21b' reach the respective closed positions;

then, half-shells 21a, 21b reach the respective closed positions; and finally, counter-sealing element 22a and sealing element 22b reach the respective closed position.

Furthermore, half-shells 21a', 21b'; 21a, 21b remain in the respective closed position for a certain length parallel to axis A before corresponding counter-sealing elements 22b and sealing elements 22b reach the respective closed positions.

With particular reference to FIGS. 1 and 5, each operative branches P1, Q1 of path P, Q comprises, proceeding according to the advancing direction of carriages 14a', 14b'; 15a, 15b; 14a, 15a:

- a respective initial portion 31a, 31b, along which both half-shells 21a', 21b'; 21a, 21b and counter-sealing element 22a and sealing element 22b are in respective open positions;
- a respective portion 30a, 30b, along which half-shell 21a, 21b are in respective closed positions while half-shells 21a', 21b' and counter-sealing element 22a and sealing element 22b remain in respective open positions;
- a respective portion 32a, 32b, along which half-shells 21a, 21b remain in respective closed position, half-shells 21a', 21b' are in respective closed position, and counter-sealing element 22a and sealing element 22b are still in respective open positions;
- a respective portion 33a, 33b, along which both half-shells 21a, 21b, both half-shells 21a', 21b' and sealing element 22b and counter-sealing element 22a are in respective closed positions; and
- a respective end portion 34a, 34b, along which half-shell 21a is in the respective open position while half-shell 21b is in the respective closed position and counter-sealing element 22a and sealing element 22b are in respective open positions.

Along portions 30a, 30b and portions 31a, 31b, tube 2 is constrained by half-shells 21a, 21b while counter-sealing element 22a and sealing element 22b are still in respective open positions. Accordingly, half-shells 21a', 21b' can be controlled to move along relative portion P1, Q1 towards half-shell 21a, 21b so as to complete the folding of pack 3 before the latter is sealed by counter-sealing element 22a and sealing element 22b.

Along portions 33a, 33b, sealing element 22b and counter-sealing element 22a reach the respective closed positions, in which they heat seal tube 2 and form transversal sealing band of pack 3. In the meanwhile, half-shells 21a', 21b'; 21a, 21b cooperate with respective pack 3 in formation, so as to control the volume of that respective pack 3 and cutting element 23b is extracted to cut formed pack 3 along the transversal sealing band.

Furthermore, return branch P2 comprises, proceeding according to the advancing direction of carriages 14a, 15a, a portion 35a, which is immediately adjacent to portion 34a and along which half-shell 21a', 21a and counter-sealing element 22a are in respective open positions.

Advantageously, half-shell 21b is in the closed position along a portion 35b of return branch Q2, so as to grip packs 3 and convey packs 3 in a staggered position with respect to axis A, and moves in the open position at an end 36 of portion 35b opposite to portion 34b of operative branch Q1, so as to discharge formed packs 3 on conveyor 11 in a staggered position with respect to axis A.

Portion 35b is superimposed to outlet conveyor 11, proceeding parallel to axis A.

Portion 35b is, at end 36b, tangential to direction B and to conveyor 11, so as to smoothly release formed pack 3 on conveyor 11 tangentially to direction B and same conveyor 11.

Carriage 14a', 14b'; 14a, 14b substantially comprises (FIGS. 2, 4 and 6):
- a motor element 40, which extends parallel to direction C;
- an arm 41, which protrudes laterally on one side of element 40 and is firmly fixed to element 40;
- a plate 42 which is movable along direction B with respect to arm 41 along guides 43; and
- a plate 44 which is movable with respect to plate 42 parallel to direction B and along guides (not shown).

Motor element 40 comprises a bar, which is provided at opposite axial ends thereof, with a pair of wheels 39, which roll inside relative endless slots defined by relative tracks 13a, 13b.

In the embodiment shown, wheels 39 rotate about relative axes thereof parallel to direction C.

Motor element 40 is, in the embodiment shown, magnetically coupled with magnetic field sources 55 (FIGS. 3 and 6) which are carried in fixed position by respective surfaces 17a, 17b, so that carriage 14a', 14b'; 14a, 14b is self-movable along tracks 13a, 13b.

Figure 4:
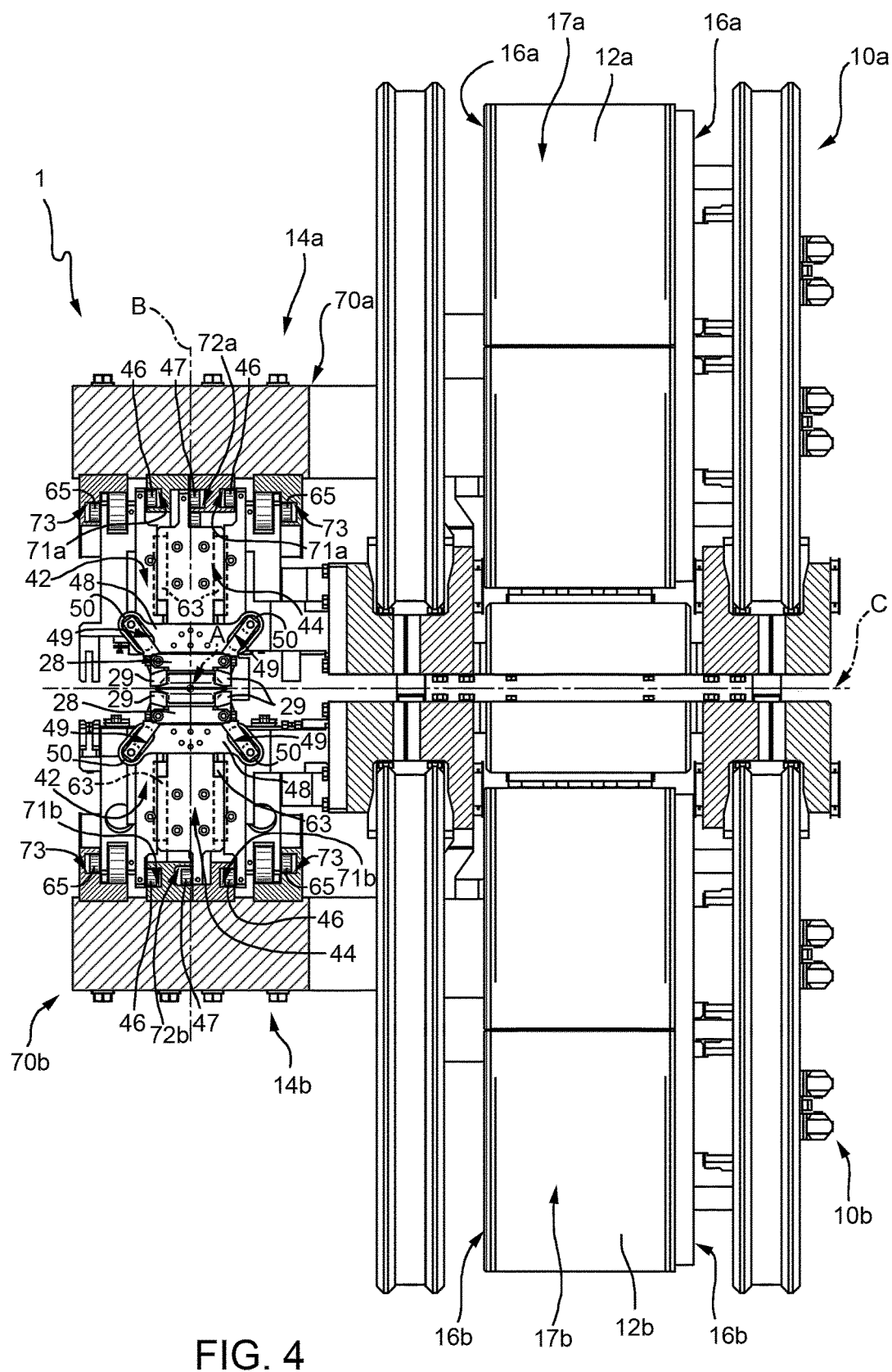
FIG. 4 is a top view of the packaging unit of FIGS. 1 to 3, with parts removed for clarity.

Plate 42 is fixed, on one side thereof, to wall 28 of half-shell 21a', 21b'; 21a, 21b and comprises, on the opposite side, a pair of rollers 46 (FIG. 4).

Plate 44 comprises, on the side of rollers 46, a roller 47 and is fixed, on the side of half-shell 21a', 21b'; 21a, 21b, to a cross-bar 48.

Roller 47 is interposed between rollers 46 along direction C.

Rollers 46 and roller 47 roll about relative axes thereof parallel to direction C.

Cross-bar 48 is parallel to arm 41 and defines a pair of opposite slots 49 (FIG. 4) inclined with respect to arm 41.

Slots 49 are slidably engaged by relative rollers 50 connected to respective flaps 29 of half-shells 21a', 21b'; 21a, 21b.

Carriage 15a, 15b substantially comprises (FIGS. 2 and 6):
- a motor element 60, which extends parallel to direction C;
- an arm 61, which protrudes laterally on one side of element 60 and is firmly fixed to element 60;
- a plate 62, which is movable along direction B with respect to arm 61 along guides 63 and supports relative sealing element 22b or counter-sealing element 22a on the side of axis A and, therefore, of tube 2.

Motor element 60 comprises a bar, which is provided at opposite axial ends thereof, with a pair of wheels 64 which roll inside relative endless slots defined by relative tracks 13a, 13b.

In the embodiment shown, wheels 64 rotate about relative axes thereof parallel to direction C.

Motor element 60 is, in the embodiment shown, magnetically coupled with magnetic field sources 55 (FIGS. 3 and 6) which are carried in fixed position by respective surfaces 17a, 17b, so that carriage 15a, 15b is self-movable along tracks 13a, 13b.

Plate 62 is fixed, on one side thereof, to sealing element 22b or counter-sealing element 22a and comprises, on the opposite side, a pair of rollers 65.

Rollers 46 and roller 47 are interposed between rollers 65 along direction C.

Each forming assembly 10a, 10b further comprises (FIGS. 2 to 4) a relative cam assembly 70a, 70b which is arranged on the opposite side of end surface 16a with respect to end surface 16b.

Each cam assembly 70a, 70b comprises:
- a pair of cam surfaces 71a, 71b in rolling contact with rollers 46 of carriages 14a', 14b'; 14a, 14b travelling along operative branches P1, Q1 of path P, Q;
- a cam surface 72a, 72b in rolling contact with rollers 47 of carriages 14a', 14b'; 14a, 14b travelling along operative branches P1, Q1 of path P, Q; and
- a pair of cam surfaces 73 which are in rolling contact with rollers 65 of carriages 15a, 15b travelling along operative branches P1, Q1 of path P, Q.

Cam surfaces 73 extend in correspondence of operative branches P1, Q1 of path P, Q.

Figure 6:
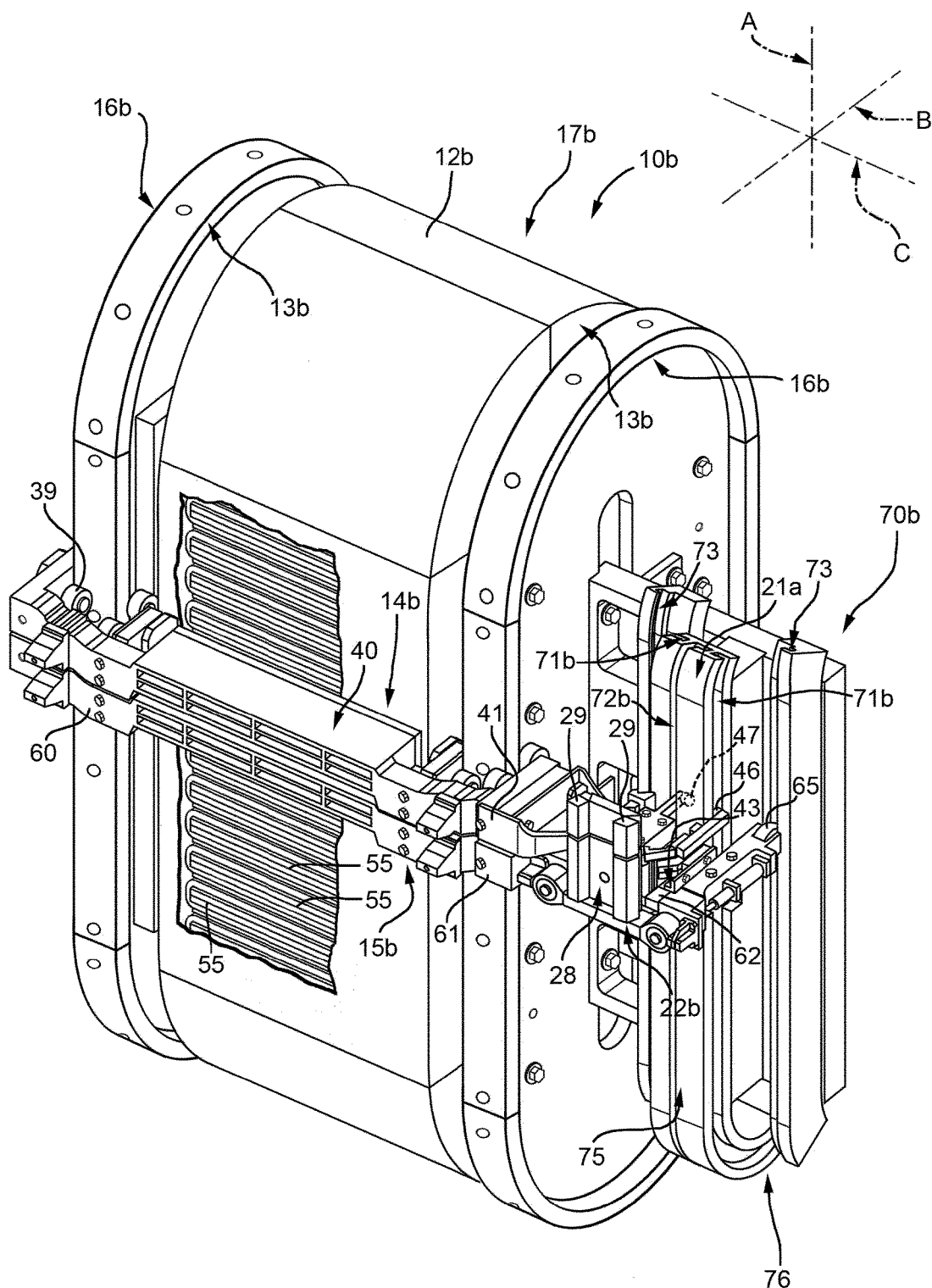
FIG. 6 is an enlarged perspective view of the forming assembly of FIGS. 1 to 5.
Figure 7:
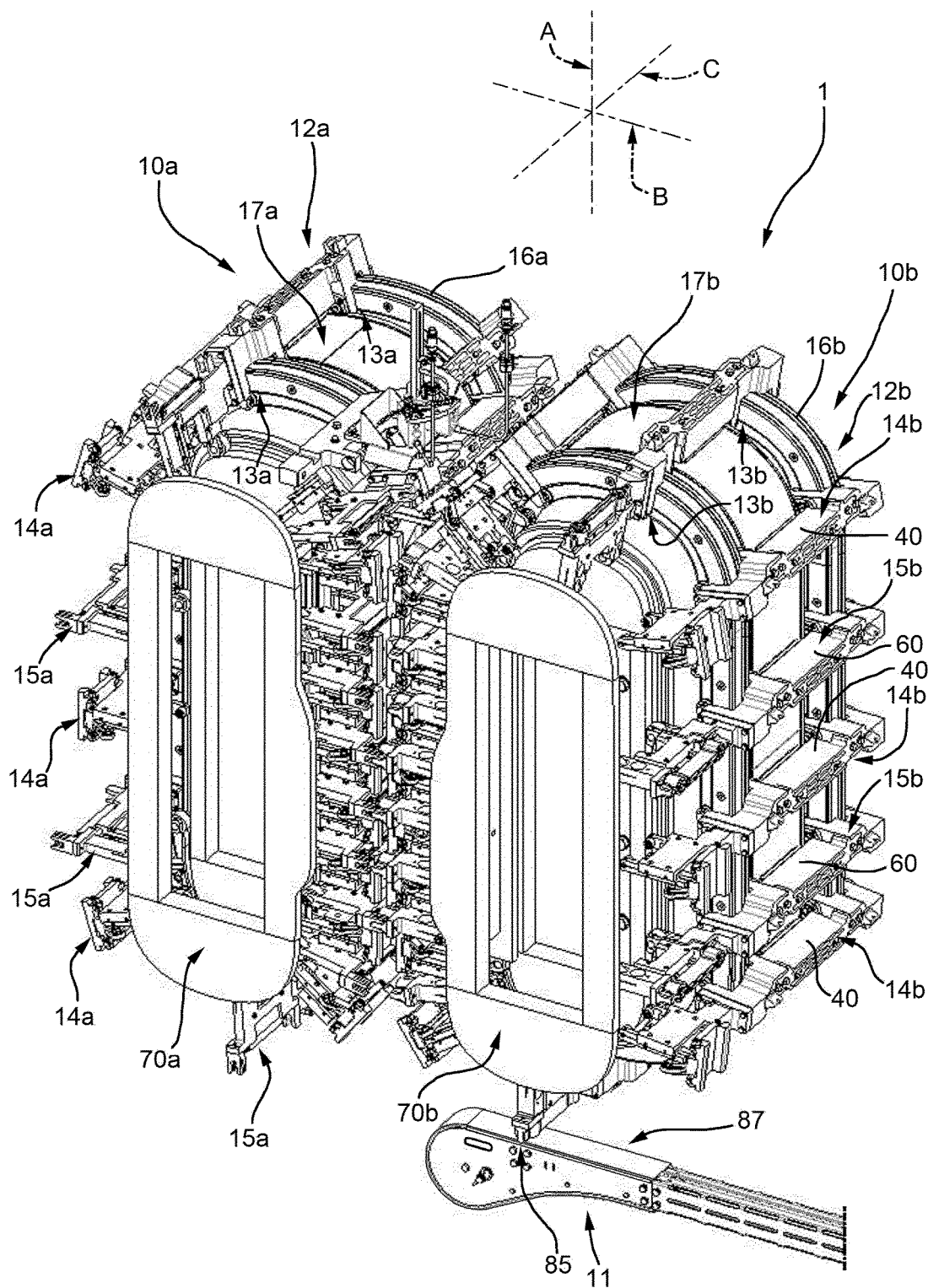
FIG. 7 is a perspective view of the packaging unit of FIGS. 1 to 6.

Cam surfaces 71a, 71b and cam surfaces 72a, 72b extend in correspondence of operative branches P1, Q1 of path P, Q and of initial portion 35b of return branch Q2 (FIG. 6).

Cam surface 72a, 72b is interposed between cam surfaces 71a, 71b.

Cam surfaces 71a, 71b and cam surfaces 72a, 72b are interposed between cam surfaces 73.

Cam surfaces 71a, 72a and cam surfaces 71b, 72b extend at different distances from axis A and are shaped in such a way that half-shells 21a', 21b'; 21a, 21b:
- remain in respective open position along respective portions 31a, 31b of operative branches P1, Q1; and
- are arranged in respective closed positions along respective portions 32a, 32b; 33a, 33b of respective operative branches P1, Q1.

Furthermore, cam surfaces 71a, 72a are shaped in such a way that half-shell 21a', 21a is arranged in the open position along portion 34a of operative branches P1.

Cam surfaces 71b, 72b comprise, in particular, (FIGS. 3 and 6):
- respective main portions 75, which have a length parallel to axis A and are shaped to keep half-shell 21b', 21b in the closed positions along portion 34b of operative branch Q1 and along initial portion 35b of return branch Q2; and
- respective end portions 76, which extend as of respective main portions 75 at increasing distances from axis A, proceeding according to the advancing direction of carriage 15a, 15b along path Q and are shaped to keep half-shell 21b in the closed positions along initial portion 35b of return branch Q2 and to displace half-shell 21b in the open position at end 36b of initial portion 35b.

Conveyor 11 comprises (FIG. 7):
- an inlet station 85, which receives, under gravity action, packs 3 which are discharged by half-shells 21b at end 36b;
- an outlet station (not-shown), which is opposite to station 85 and feeds the not-shown folding unit; and
- an operative branch 87, which extends parallel to direction B from inlet station 85 to outlet station and is tangential to portion 35b at end 36b.

In the embodiment shown, conveyor 11 is a belt conveyor.

In use, tube 2 is advanced along axis A and carriages 14a', 15a, 14a, and 14b', 15b, 14b advance independently of one another along tracks 13a, 13b, as indicated by the arrows in FIG. 1.

In particular, carriages 14a', 15a, 14a and 14b', 15b, 14b are self-movable on tracks 13a; 13b along respective paths P, Q.

The operation of unit 1 is described hereinafter with reference to only one group of carriages 14a', 14b, 14a and only one group of corresponding carriages 15a', 15b, 15a and to the only one pack 3 formed by using half-shells 21a', 21b', sealing element 22b and counter-sealing element 22a and half-shell 21a, 21b carried by respective carriages 14a', 14b', 15a, 15b; 14a, 14b.

Carriages 14a', 14b'; 15a, 15b; 14a, 14b move at first along respective return branches P2, Q2 of respective path P, Q and then along respective operative branches P1, Q1 of respective paths P, Q.

As carriages 14a', 14b'; 14a, 14b move along operative branches P1, Q1, respective half-shells 21a', 21b'; 21a, 21b move back and forth parallel to direction B and between the respective open positions and the respective closed positions.

In the very same way, as carriages 15a, 15b move along operative branches P1, Q1 respective and counter-sealing element 22a and sealing element 22b move back and forth parallel to direction B and between the respective open positions and the respective closed positions.

In particular, along operative branches P1, Q1, half-shell 21a', 21b' are arranged above counter-sealing element 21a and sealing element 21b, which are, in turn, arranged above half-shell 21a, 21b.

The operation of unit 1 is now described starting from a position, in which, along portions 31a, 31b, half-shells 21a', 21b'; 21a, 21b, counter-sealing element 22a and sealing element 22b are in respective open positions along respective portions 31a, 31b of respective operative branches P1, Q1.

In this situation, half-shells 21a', 21b', 21a, 21b, counter-sealing element 22a and counter-sealing element 22b are detached from tube 2. Furthermore, flaps of half-shells 21a, 21b diverge from wall 28, proceeding from the latter towards axis A.

Along portions 30a, 30b of respective operative branch P1, Q1, half-shells 21a, 21b are in respective closed position, while half-shells 21a', 21b', counter-sealing element 22a and sealing element 22b remain in respective open positions.

Along portions 32a, 32b of respective operative branches P1, Q1, half-shells 21a, 21b remain in the respective closed positions, whereas half-shells 21a', 21b' reach the respective closed position. In the meanwhile, counter-sealing element 22a and sealing element 22b remain in the respective open positions.

Furthermore, along portion 32a, 32b, tube 2 is constrained by half-shells 21a, 21b—arranged in a bottom position—and moved by half-shells 21a', 21b'—arranged in a top position—towards half-shells 21a, 21b, with sealing element 22b and counter-sealing element 22a still in the respective open positions.

Accordingly, the action of half-shells 21a', 21b is effective in completing the folding of packs 3.

Along portions 33a, 33b of respective operative branches P1, Q1, counter-sealing element 22a and sealing element 22b are in the closed position, with half-shells 21a', 21b'; 21a, 21b still kept in the respective closed positions.

Accordingly, flaps 29 of opposite half-shells 21a', 21b'; 21a, 21b face one another and define a parallelepiped cavity, which houses a portion of tube 2 destined to form pack 3.

Sealing element 22b is activated to heat-seal tube 2 in the desired sealing area thereof, so as to form transversal sealing band of pack 3 in the desired area with respect to the images repeatedly printed on tube 2.

During the sealing of the transversal sealing band, half-shells 21a', 21b'; 21a, 21b control the volume of pack 3.

Furthermore, cutting element 23b is extracted up to engage the seat, so as to cut the transversal sealing band of pack 3, so as to separate the latter from the remaining part of tube 2.

Along portions 34a, 34b, counter-sealing element 22a and sealing element 22b are in the respective open positions, half-shell 21a', 21a is in the open position, while half-shell 21b', 21b remains in the closed position.

As a result, formed, sealed and cut pack 3 is gripped and held by half-shell 21b.

The further movement of carriage 14b along track 13b causes the corresponding movement of half-shell 21b along initial portion 35b of path Q1.

As half-shell 21b reaches end 36b of portion 35b of Q1, it is moved from the closed position to the open position, thus releasing pack 3 tangentially to direction B on inlet station 85 of conveyor 11, which feeds pack 3 to the not-shown folding unit.

The movement of half-shells 21a', 21b'; 21a, 21b between the respective open positions and closed positions is determined by the rolling of rollers 46, 47 of carriages 14a, 14b over respective cam surfaces 71a, 71b; 72a, 72b.

This movement is described starting from the open positions of half-shells 21a', 21b'; 21a, 21b, when carriages 14a, 14b move along respective portions 31a, 31b of operative branches P1, Q1.

Due to the rolling movement of rollers 46 on cam surfaces 71a, 71b, plates 42 move towards axis A and tube 2 along respective guides 43 with respect to respective motor elements 40 and respective arms 41.

As a result, plates 42 move parallel to direction B, thus causing the displacement of the relative whole half-shells 21a', 21b'; 21a, 21b towards tube 2 up to a position in which walls 28 contact tube 2.

Then, the rolling movement of rollers 47 on relative cam surfaces 72a, 72b causes the movement of relative plates 44 with respect to corresponding plates 42 parallel to direction B, towards axis A and on not-shown guides.

As a result, slots 49 move towards axis A, causing the rotation of rollers 50 and of flaps 29 from a position in which they diverge with respect to wall 28 proceeding towards tube 2 up to reach a position, in which they are orthogonal to wall 28 and grip tube 2 or sealed pack 3.

At this stage, the half-shells 21a', 21b'; 21a, 21b are arranged in the respective closed positions.

The movement of half-shells 21a', 21b'; 21a, 21b from the respective closed position to the respective open positions is determined by the fact that at first respective plate 44 move away from respective plates 42 and slide on respective not-shown guides parallel to direction B. In this way, flaps 29 rotate back up to a position in which they diverge from respective walls 28, proceeding from walls 28 towards axis A.

The movement of half-shells 21a', 21b'; 21a, 21b is completed, thanks to the fact that plates 42 moves away from tube 2 and slide parallel to direction B along relative guides 43 with respect to relative arm 41.

These movements of half-shells 21a', 21b'; 21a, 21b towards respective closed positions are eased by not-shown springs which act on plate 42 and plate 44.

In this way, the whole half-shells 21a', 21b'; 21a, 21b are moved away from tube 2, up to reach again the respective open positions.

The movement of counter-sealing element 22a and sealing element 22b between the respective open positions and closed positions is determined by the rolling of rollers 65 of carriages 14a, 14b over respective cam surfaces 73.

That movement is described starting from the open positions of counter-sealing element 22a and sealing element 22b, when respective carriages 15a, 15b move along respective operative branches P1, Q1.

Due to the rolling of rollers 65 onto respective cam surfaces 73, plates 62 move along respective guides 63 parallel to direction B and towards tube 2 with respect to arm 61 and motor element 60, up to contact tube 2 in the desired position for forming the transversal sealing band of pack 3.

At this stage, sealing element 22b and counter-sealing element 22a are arranged in the respective closed positions.

The movement of sealing element 22b and counter-sealing element 22a from the respective closed position to the respective open positions is determined by the fact that plates 62 move back along respective guide 63 parallel to direction B and on the opposite side of tube 2.

This movement is eased by not-shown springs, which act on plates 62.

The advantages of forming assembly 10a, 10b and the method according to the present invention will be clear from the above description.

The half-shells 21b are kept in respective closed position along portion 34b of portion Q2 of path Q diverging from axis A, and are displaced in respective open position at end 36b, so as to discharged packs 3 on conveyor 11.

In this way, it is ensured that, even in presence of connecting bridges between two consecutive cut and sealed packs 3, the movement of half-shell 21b detaches the consecutive sealed packs 3 and thus properly convey separated packs 2 to conveyor 11.

In this way, it is achieved a higher degree of precision and repeatability in the detachment and feeding of packs 3 to conveyor 11 with respect to the known solutions, which substantially rely on the gravity action.

Clearly, changes may be made to forming assembly 10a, 10b and the method as described and illustrated herein without, however, departing from the scope defined in the accompanying claims.

In particular, forming assemblies 10a, 10b could comprise chain conveyors of the type shown in EP-B-0887265 instead of carriages 14a, 14b; 15a, 15b.

The invention claimed is:

1. A forming assembly for forming a plurality of sealed packs from a tube of packaging material, the forming assembly comprising:
a first conveyor movable along a first path, wherein the first path is configured to proceed according to an advancing direction of the first conveyor;
a first operative branch having a main elongation direction parallel to an advancing direction of the tube; and
a first return branch comprising an initial portion arranged immediately downstream of the first operative branch, wherein the initial portion of the first return branch extends in a direction transverse to the advancing direction of the tube;
wherein the first conveyor comprises:
one of a sealer or a counter-sealer configured to seal a pack of the plurality of sealed packs along the first operative branch; and
a first half-shell configured for movement along the first operative branch between:
a first rest position, in which the first half-shell is detached from the tube or the pack, and
a first operative position, in which the first half-shell grips the tube or the pack, wherein the first half-shell is configured to be in the first operative position along a first portion of the first operative branch;

wherein the first half-shell is configured to be in the first operative position along the initial portion of the first return branch so as to grip and convey the pack in a staggered position with respect to the advancing direction of the tube; and wherein the first half-shell is configured to move from the first operative position to the first rest position at an end of the initial portion of the first return branch opposite to the first portion of the first operative branch so as to discharge the pack in a staggered position with respect to the advancing direction of the tube.

2. The forming assembly of claim 1, wherein the initial portion of the first return branch is arranged immediately downstream and adjacent to the first portion of the first operative branch, with respect to to the advancing direction of the first conveyor along the first path.

3. The forming assembly of claim 2, wherein the first operative branch further comprises:
   a second portion; and
   a third portion,
   wherein the first half-shell is configured to be in the first operative position when the first half-shell is positioned along the second and third portions of the first operative branch, and
   wherein the third portion of the first operative branch is interposed between the second portion of the first operative branch and the first portion of the first operative branch, with respect to the advancing direction of the first conveyor along the first path.

4. The forming assembly of claim 3,
   wherein the one of a sealer or a counter-sealer is configured for movement between:
      a second operative position, in which the one of a sealer or a counter-sealer contacts the tube so as to seal the pack, and
      a second rest position, in which the one of a sealer or a counter-sealer is detached from the tube or the pack;
   wherein the one of a sealer or a counter-sealer is configured to be in the second rest position when the one of a sealer or a counter-sealer is positioned along the second portion of the first operative branch and the first portion of the first operative branch; and
   wherein the one of a sealer or a counter-sealer is configured to be in the second operative position when the one of a sealer or a counter-sealer is positioned along the third portion of the first operative branch.

5. The forming assembly of claim 1,
   wherein the first half-shell comprises:
      a main wall; and
      a pair of flaps hinged to the main wall;
   wherein the first conveyor comprises:
      a first body, the first body configured for movement with respect to a frame of the forming assembly when the first body is positioned along the first path;
      a second body, wherein the second body protrudes from the first body, is staggered from the frame of the forming assembly, carries the main wall of the first half-shell, and comprises a second cam follower; and
      a third body, the third body configured for movement with respect to the second body in a direction transverse to the advancing direction of the tube, wherein the third body is operatively connected to the flaps and comprises at least one third cam follower; and wherein the forming assembly includes:
      a second cam surface configured to cooperate with the second cam follower so as to move the main wall towards or away from the tube; and
      a third cam surface configured to cooperate with the third cam follower so as to move the flaps with respect to the main wall.

6. The forming assembly of claim 5, wherein at least one of the second cam surface and the third cam surface comprise:
   a main portion, wherein the main portion is elongated in a direction parallel to the advancing direction of the tube and is configured to keep the first half-shell in the first operative position when the first half-shell is positioned along the first portion of the first operative branch; and
   a curved end portion,
      wherein the curved end portion extends the main portion at increasing distances from the advancing direction of the tube, with respect to the advancing direction of the first conveyor, and
      wherein the curved end portion is configured to keep the first half-shell in the first operative position when the first half-shell is positioned along the initial portion of the first return branch and to displace the first half-shell into the first rest position when the first half-shell is positioned at the end of the initial portion of the first return branch.

7. The forming assembly of claim 5,
   wherein the frame of the forming assembly defines at least one track, the first body contacting and being self-movable on the track along the first path; and
   wherein the second body and third body are driven by the first body along the first path.

8. The forming assembly of claim 1, further comprising:
   a discharge conveyor arranged at the end of the initial portion of the first return branch, wherein the discharge conveyor is tangential to the initial portion of the first return branch at the end of the initial portion of the first return branch and is configured to directly receive the plurality of sealed packs discharged from the first half-shell.

9. A packaging unit for producing a plurality of sealed packs from a tube of packaging material, the packaging unit comprising:
   a forming assembly according to claim 1; and
   an additional forming assembly, the additional forming assembly configured to cooperate with the forming assembly to seal the plurality of sealed packs, wherein the additional forming assembly comprises:
      an additional conveyor configured for movement along an additional endless path, the additional endless path configured to proceed according to the advancing direction of the first conveyor;
      an additional operative branch having a main elongation direction parallel to the advancing direction of the tube; and
      an additional return branch comprising an additional initial portion arranged immediately downstream of the additional operative branch, wherein the additional initial portion of the additional return branch extends in a direction transverse to the advancing direction of the tube;

wherein the additional conveyor comprises:
  a sealer and a counter-sealer configured to cooperate with each other to seal a pack of the plurality of sealed packs along the additional operative branch; and
  a second half-shell, wherein when the second half-shell is positioned along the additional operative branch, the second half-shell is configured for movement between:
    an additional first rest position, in which the second half-shell is detached from the tube or the pack, and
    an additional first operative position, in which the second half-shell is configured to grip the tube or the pack and to cooperate with the first half-shell to control the shape of the pack during formation thereof;
  wherein the second half-shell is configured to be in the additional first operative position when the second half-shell is positioned along an additional second portion and an additional third portion of the additional operative branch, the additional second portion and additional third portion of the additional operative branch facing and being opposite to the second portion and third portion of the first operative branch, respectively;
  wherein the second half-shell is configured to be in the additional first rest position when the second half-shell is positioned along an additional first portion of the additional operative branch, the additional first portion of the additional operative branch facing and being opposite to the first portion of the first operative branch; and
  wherein the first portion of the first operative branch is adjacent to and upstream of the initial portion of the first return branch, with respect to the advancing direction of the first conveyor.

10. A method for forming a plurality of sealed packs from a tube of packaging material, the method comprising:
  advancing the tube along an advancing direction;
  moving a first conveyor along an endless first path, wherein the endless first path includes:
    a first operative branch having a main elongation direction parallel to the advancing direction of the tube, and
    a first return branch having an initial portion arranged immediately downstream of the first operative branch and extending in a direction transverse to the advancing direction of the tube; and
  wherein the first conveyor comprises:
    one of a sealer or a counter-sealer configured to seal a pack of the plurality of sealed packs along the first operative branch, and
    a first half-shell;
  moving the first half-shell, when the first half-shell is positioned along the first operative branch, between:
    a first rest position, in which the first half-shell is detached from the tube or the pack; and
    a first operative position, in which the first half-shell grips the tube or the pack;
  arranging the first half-shell in the first operative position when the first half-shell is positioned along a first portion of the first operative branch;
  keeping the first half-shell in the first operative position when the first half-shell is positioned along the initial portion of the first return branch, so as to grip and convey the pack in a staggered position with respect to the advancing direction of the tube; and
  moving the first half-shell from the first operative position to the first rest position when the first half-shell is positioned at an end of the initial portion of the first return branch, so as to discharge the pack in a staggered position with respect to the advancing direction of the tube.

11. The method of claim 10, wherein the initial portion of the first return branch is arranged immediately downstream and adjacent to the first portion of the first operative branch, with respect to the advancing direction of the first conveyor along the first path.

12. The method of claim 10, further comprising:
  arranging the first half-shell in the first operative position when the first half-shell is positioned along a second portion of the first operative branch; and
  arranging the first half-shell in the first operative position when the first half-shell is positioned along a third portion of the first operative branch,
  wherein the third portion of the first operative branch is interposed between the second portion of the first operative branch and the first portion of the first operative branch, with respect to the advancing direction of the first conveyor along the first path.

13. The method of claim 12, further comprising:
  moving the one of a sealer or a counter-sealer between:
    a second operative position, in which the one of a sealer or a counter-sealer contacts the tube so as to seal the pack, and
    a second rest position, in which the one of a sealer or a counter-sealer is detached from the tube or the pack;
  arranging the one of a sealer or a counter-sealer in the second rest position when the one of a sealer or a counter-sealer is positioned along the second portion of the first operative branch and the first portion of the first operative branch; and
  arranging the one of a sealer or a counter-sealer in the second operative position when the one of a sealer or a counter-sealer is positioned along the third portion of the first operative branch.

14. The method of claim 10, further comprising:
  directly discharging the pack from the first half-shell on a discharge conveyor, wherein the discharge conveyor is arranged at the end of the initial portion of the first return branch and is tangential to the initial portion of the first return branch at the end of the initial portion of the first return branch.

15. The method of claim 10, further comprising:
  moving an additional conveyor along an endless additional path,
    wherein the endless additional path includes:
      an additional operative branch having a main elongation direction parallel to the advancing direction of the tube, and
      an additional return branch comprising an additional initial portion, wherein the additional initial portion is arranged immediately downstream of the additional operative branch and extends in a direction transverse to the advancing direction of the tube; and
    wherein the additional conveyor comprises:
      the other one of a sealer or a counter-sealer, and
      a second half-shell;

moving the second half-shell, when the second half-shell is positioned along the additional operative branch, between:
an additional first rest position, in which the second half-shell is detached from the tube or the pack, and
an additional first operative position, in which the second half-shell grips the tube or the pack; and
arranging the second half-shell in the additional first rest position when the second half-shell is positioned along an additional first portion of the additional operative branch, wherein the additional first portion of the additional operative branch faces and is opposite to the first portion of the first operative branch.

* * * * *